(12) United States Patent
Fu et al.

(10) Patent No.: US 9,161,041 B2
(45) Date of Patent: Oct. 13, 2015

(54) APPARATUS AND METHOD OF EFFICIENT SAMPLE ADAPTIVE OFFSET

(75) Inventors: Chih-Ming Fu, Hsinchu (TW);
Ching-Yeh Chen, Taipei (TW);
Chia-Yang Tsai, New Taipei (TW);
Yu-Wen Huang, Taipei (TW);
Shaw-Min Lei, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 638 days.

(21) Appl. No.: 13/177,424

(22) Filed: Jul. 6, 2011

(65) Prior Publication Data

US 2012/0177103 A1    Jul. 12, 2012

Related U.S. Application Data

(63) Continuation-in-part of application No. 12/987,151, filed on Jan. 9, 2011, and a continuation-in-part of application No. 13/158,427, filed on Jun. 12, 2011.

(60) Provisional application No. 61/432,482, filed on Jan. 13, 2011, provisional application No. 61/436,296, filed on Jan. 26, 2011, provisional application No. 61/466,083, filed on Mar. 22, 2011.

(51) Int. Cl.
*H04N 7/26* (2006.01)
*H04N 19/117* (2014.01)
(Continued)

(52) U.S. Cl.
CPC ........... *H04N 19/117* (2014.11); *H04N 19/136* (2014.11); *H04N 19/14* (2014.11);
(Continued)

(58) Field of Classification Search
CPC ....... H04N 7/26; H04N 7/50; H04N 7/26244; H04N 7/26271
USPC ............ 375/240.02, 240.12, 240.16; 382/166
See application file for complete search history.

(56) References Cited

U.S. PATENT DOCUMENTS

2006/0013310 A1    1/2006   Lee et al.
2007/0098076 A1    5/2007   Sun et al.
(Continued)

FOREIGN PATENT DOCUMENTS

KR       20100074250      7/2010

OTHER PUBLICATIONS

McCann, K., W. Han, and I. Kim. "Samsung's Response to the Call for Proposals on Video Compression Technology, document JCTVC-A124." Joint Collaborative Team on Video Coding (JCT-VC), Dresden, Germany (2010).*
(Continued)

*Primary Examiner* — Jay Patel
*Assistant Examiner* — Neil Mikeska
(74) *Attorney, Agent, or Firm* — McClure, Qualey & Rodack, LLP

(57) ABSTRACT

For sample adaptive offset, classification may be used to classify the pixels into multiple categories and pixels in each category are offset compensated using an offset value for the category. The classification may be based on values of the current pixel and its neighboring pixels before SAO compensation. Therefore, the SAO compensated pixel cannot be written back to the current pixel location until the category for all pixels are determined. An embodiment of the present invention stores the relation between the current pixel and said one or more neighboring pixels so that the SAO compensated current pixel can replace the current pixel without buffering the to-be-processed pixels for classification. The SAO process may be performed on a region by region basis to adapt to the local characteristics of the picture. Rate-distortion optimization (RDO) is often used to guide the mode decision, such as region splitting/region merging decision. Computations associated with the RDO process usually are very computational intensive. Accordingly, distortion reduction estimation is developed which can substantially reduce the required computation associated with RDO.

6 Claims, 14 Drawing Sheets

(51) Int. Cl.
*H04N 19/82* (2014.01)
*H04N 19/176* (2014.01)
*H04N 19/147* (2014.01)
*H04N 19/14* (2014.01)
*H04N 19/182* (2014.01)
*H04N 19/136* (2014.01)
*H04N 19/86* (2014.01)
*H04N 19/61* (2014.01)
*H04N 19/85* (2014.01)

(52) U.S. Cl.
CPC .......... *H04N 19/147* (2014.11); *H04N 19/176* (2014.11); *H04N 19/182* (2014.11); *H04N 19/82* (2014.11); *H04N 19/86* (2014.11); *H04N 19/61* (2014.11); *H04N 19/85* (2014.11)

(56) References Cited

U.S. PATENT DOCUMENTS

| | | |
|---|---|---|
| 2007/0206871 A1* | 9/2007 | Jalil et al. ................. 382/233 |
| 2009/0086814 A1 | 4/2009 | Leontaris et al. |
| 2009/0154567 A1 | 6/2009 | Lei et al. |
| 2009/0252412 A1* | 10/2009 | Matsushita .................. 382/167 |
| 2009/0257670 A1 | 10/2009 | Chiu et al. |
| 2010/0027881 A1* | 2/2010 | Kim et al. .................... 382/166 |
| 2010/0111182 A1* | 5/2010 | Karczewicz et al. .... 375/240.16 |
| 2011/0280309 A1* | 11/2011 | Francois et al. ......... 375/240.16 |
| 2013/0259125 A1* | 10/2013 | Kim et al. ................ 375/240.12 |
| 2013/0301732 A1 | 11/2013 | Hsu et al. |

OTHER PUBLICATIONS

"CE8 Subset3: Picture Quadtree Adaptive Offset", Document: JCTVC-D122, Joint Collaborative Team on Video Coding (JCT-VC) of ITU-T SG16 WP3 and ISO/IEC JTC1/SC29/WG11, 4th Meeting: Daegu, KR, Jan. 20-28, 2011.

"CE13: Sample Adaptive Offset with LCU-Independent Decoding", Document: JCTVC-E049, Joint Collaborative Team on Video Coding (JCT-VC) of ITU-T SG16 WP3 and ISO/IEC JTC1/SC29/WG11, 5th Meeting: Geneva, CH, Mar. 16-23, 2011.

* cited by examiner

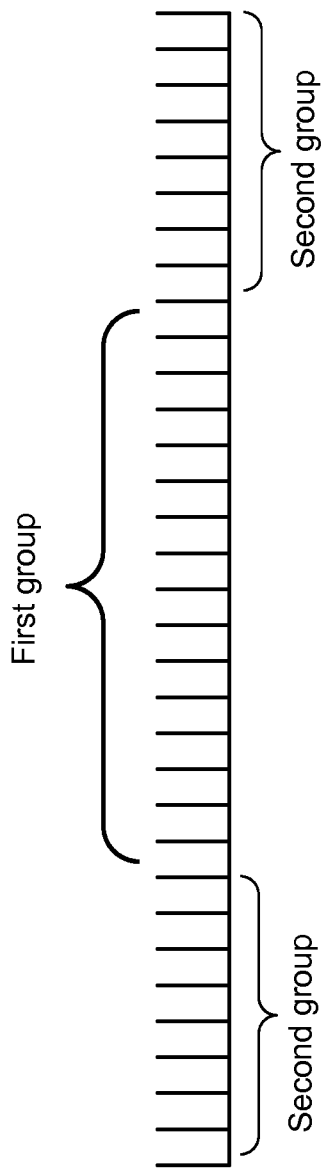

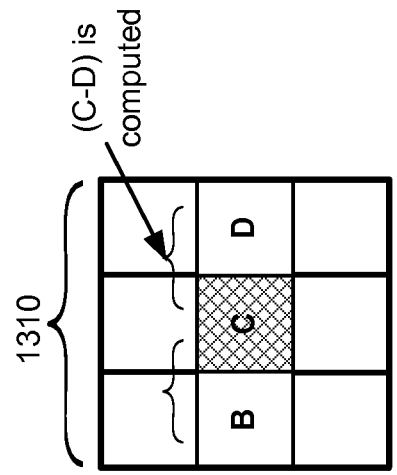
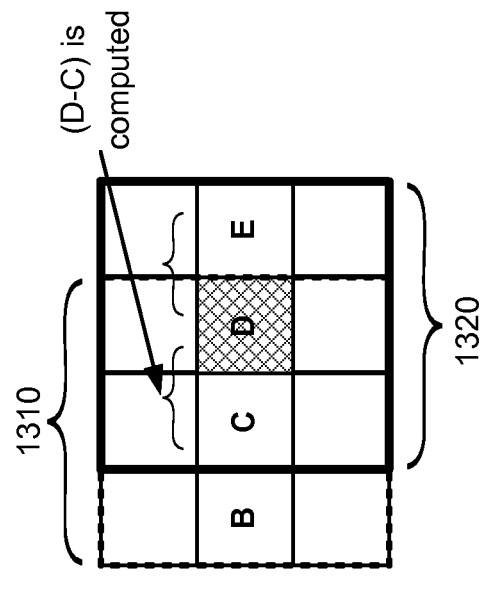
Fig. 13

APPARATUS AND METHOD OF EFFICIENT SAMPLE ADAPTIVE OFFSET

CROSS REFERENCE TO RELATED APPLICATIONS

The present invention claims priority to U.S. Provisional Patent Application, No. 61/432,482, filed Jan. 13, 2011, entitled "Picture Quadtree Adaptive Offset", U.S. Provisional Patent Application, No. 61/436,296, filed Jan. 26, 2011, entitled "Improved Offset Method", U.S. Provisional Patent Application, No. 61/466,083, filed Mar. 22, 2011, entitled "Sample Adaptive Offset", U.S. Non-Provisional patent application, Ser. No. 12/987,151, entitled "Apparatus and Method of Adaptive Offset for Video Coding", filed on Jan. 9, 2011, and U.S. Non-Provisional patent application, Ser. No. 13/158,427, entitled "Apparatus and Method of Sample Adaptive Offset for Video Coding", filed on Jun. 12, 2011. The U.S. Provisional Patent Applications and U.S. Non-Provisional patent applications are hereby incorporated by reference in their entireties.

FIELD OF THE INVENTION

The present invention relates to video processing. In particular, the present invention relates to apparatus and method of efficient sample adaptive offset compensation.

BACKGROUND

In a video coding system, the video data are subject to various processing such as prediction, transform, quantization, deblocking, and adaptive loop filtering. Along the processing path in the video coding system, certain characteristics of the processed video data may be altered from the original video data due to the operations applied to the video data. For example, the mean value of the processed video may be shifted. Intensity shift may cause visual impairment or artifacts, which is especially more noticeable when the intensity shift varies from picture to picture. Therefore, the pixel intensity shift has to be carefully compensated or restored to alleviate the artifacts. Some intensity offset schemes have been used in the field. An intensity offset scheme proposed for High-Efficiency Video Coding (HEVC) classifies each pixel in the processed video data into one of multiple categories according to a context selected. For example, the context may be the pixel intensity of the processed video data. Alternatively, the context may be a combination of a current pixel and its surrounding pixels. Depending on where the adaptive offset is applied, the processed video data may represent the reconstructed video, the deblocked video, the adaptive loop filtered video, or other video in an intermediate stage. A characteristic measurement is derived according to the selected context and a category is determined according to the measured characteristic. For each category, intensity shift between the original pixels and the processed pixels is determined. The intensity shift is also called the "offset value" in this disclosure. Accordingly, the offset value is applied to the processed pixels belonging to the category to compensate the intensity shift. The process of intensity shift compensation or restoration for processed video data based on the category of each pixel is termed "sample adaptive offset (SAO)" in this disclosure.

The conventional SAO scheme often determines the category for the pixels on a picture by picture or slice by slice basis. However, picture contents often are dynamic and the characteristic may vary from region to region within a picture.

Accordingly, a sample adaptive offset scheme is disclosed in U.S. Non-Provisional patent application, Ser. No. 13/158,427, entitled "Apparatus and Method of Sample Adaptive Offset for Video Coding", filed on Jun. 12, 2011, where a group of SAO types are used to classify pixels in a region and each SAO type classifies the pixels into multiple categories. Some SAO types are associated with edge offset based classification, where the classification of a current pixel involves neighboring pixels. Since there are multiple SAO types, an encoder usually has to derive the offsets, add the offsets to pixels, and then compute distortion for each region with one SAO type. Therefore, the mode decision process of SAO needs to access the picture buffer many times. This multi-pass encoding algorithm may require a lot of external memory access leading to high power consumption and long latency. It is desirable to perform the mode decision for SAO without any additional picture buffer access. After all SAO parameters are derived, only one additional pass is required to perform offset compensation accordingly.

The SAO process is preferred to be done on a region by region basis to adapt to the local characteristics of the picture. Rate-distortion optimization (RDO) is often used to guide the mode decision (i.e., region splitting/region merging decision). Computations associated with the RDO process usually is very computational intensive. It is desirable to use a fast algorithm to speed up RDO process.

BRIEF SUMMARY OF THE INVENTION

An apparatus and method for of mode decision for sample adaptive offset (SAO) compensation of processed video data using rate-distortion optimization (RDO) are disclosed. The method according to the present invention comprises receiving the processed video data, identifying SAO modes, estimating distortion associated with each of the modes according to distortion reduction estimation, determining rate-distortion (RD) cost based on the distortion for said each of the modes; selecting a best mode among the modes, wherein the best mode has a smallest RD cost, and applying SAO to the processed video data according to the best mode selected. The distortion reduction estimation is related to a number of pixels for said each of the modes (iCount), an offset value to be added to the pixels belonging to said each of the modes (iOffset), and a sum of the offset value between original signal and reconstructed signal (iOffsetOrg) associated with the processed video data. Furthermore, the distortion reduction estimation is related to (iCount*iOffset*iOffset)−(iOffsetOrg*iOffset*2). Another aspect of the present invention addresses fast algorithm for SAO region splitting or region merging, where the distortion reduction estimation for a small regions is re-used for calculating the distortion reduction estimation for a respective large region.

An apparatus and method of sample adaptive offset (SAO) compensation of processed video data are disclosed. The method according to the present invention comprises receiving the processed video data, determining a category for a current pixel of the processed video data according to edge offset (EO) based classification, wherein the EO based classification is related to the current pixel and one or more neighboring pixels, compensating the current pixel using an offset value associated with the category to generated a compensated current pixel, storing relation between the current pixel and said one or more neighboring pixels, and replacing the current pixel with the compensated current pixel within a substantially small number of pixel periods after determining the category for the current pixel. To further reduce the required computations, at least a portion of the relation between the current pixel and said one or more neighboring pixels is used for determining a category of another pixel. The relation between the current pixel and said one or more neighboring pixels can be based on a sign function, and a look-up table is used for determining the category for the current pixel.

BRIEF DESCRIPTION OF THE DRAWINGS

FIG. 6 illustrates an example of two SAO types based on band offset (BO), where the first type consists of central bands and the second type consists of side bands.

FIG. 13 illustrates an example of re-use of partial results from a previous pixel for edge offset (EO) based classification.

DETAILED DESCRIPTION OF THE INVENTION

Figure 1:
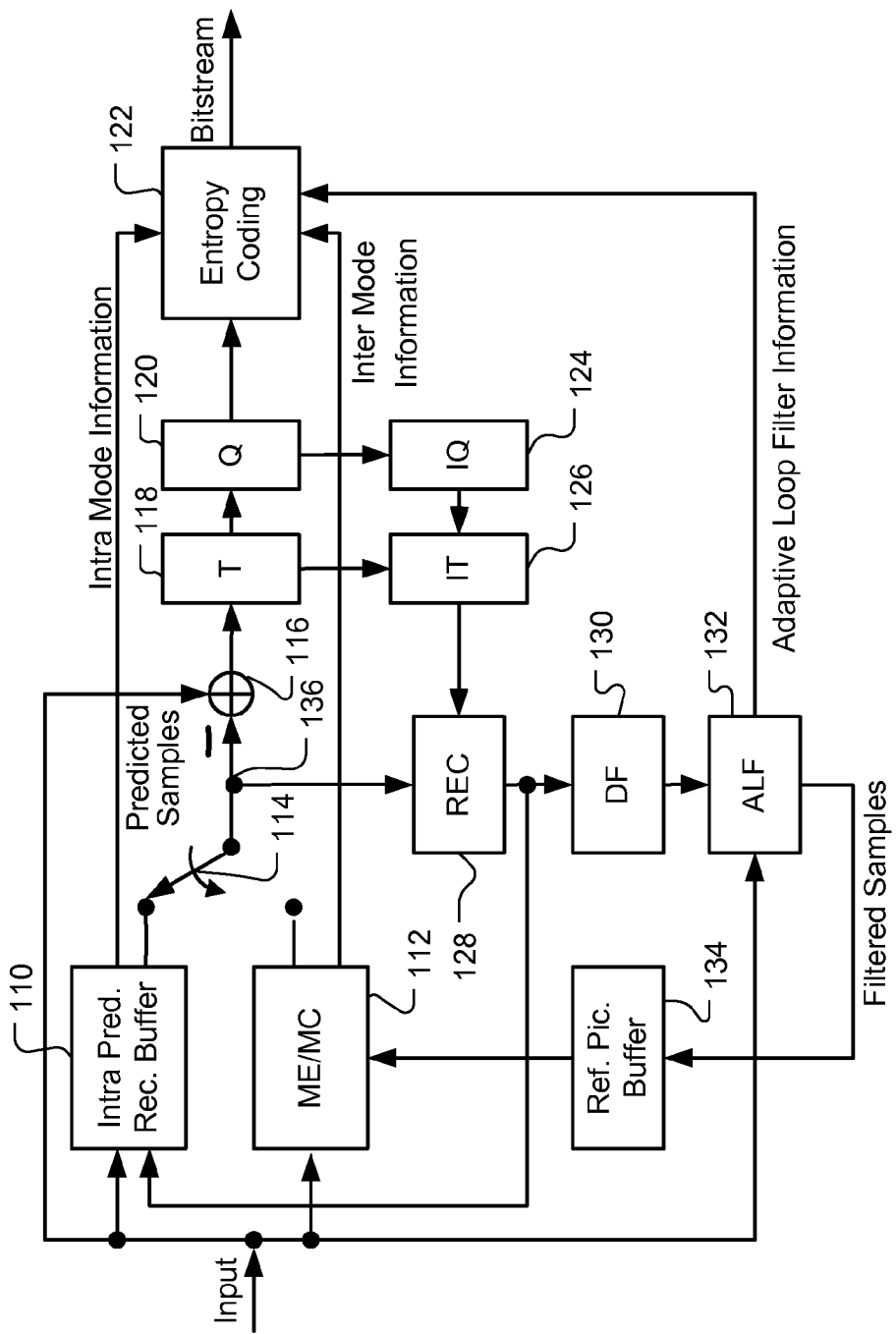
FIG. 1 illustrates a system block diagram of an exemplary video encoder having a reconstruction loop including deblocking filter and adaptive loop filter.

In a video coding system, the video data are subject to various processing such as prediction, transform, quantization, deblocking, and adaptive loop filtering. Along the processing path in the video coding system, certain characteristics of the processed video data may be altered from the original video data due to the operations applied to video data. For example, the mean value of the processed video may be shifted. Intensity shift may cause visual impairment or artifacts, which is especially more noticeable when the intensity shift varies from picture to picture. Therefore, the pixel intensity shift has to be carefully compensated or restored to alleviate the artifacts. There may be various reasons that may cause certain characteristics of the processed video data to be altered. The changes in characteristics of processed video data may be intrinsically related to the operations applied. For example, when a low-pass filter is applied to the video data, pixel values corresponding to a sharp edge will have reduced slope. The pixel value on one side of the edge may be increased and the pixel value on the other side may be decreased. In this example, if sample adaptive offset can take into consideration of the edge characteristics, video quality may be improved. An adaptive offset scheme proposed to the original High-Efficiency Video Coding (HEVC) classifies each pixel in the processed video data into one of multiple categories according to a context selected. For example, the context may be the pixel intensity of the processed video data. Alternatively, the context may be a combination of a current pixel and its surrounding pixels. Depending on where the adaptive offset is applied, the processed video data may represent the reconstructed video, the deblocked video, the adaptive loop filtered video, or other video in an intermediate stage. A characteristic measurement is derived according to the selected context and a category is determined according to the measured characteristic. For each category, intensity shift between the original pixels and the processed pixels is determined. The intensity shift is also called the "offset value" in this disclosure. Accordingly, the offset value is applied to the processed pixels belonging to the category to compensate the intensity shift. The process of intensity shift compensation or restoration for processed video data based on the category of each pixel is termed "sample adaptive offset (SAO)" in this disclosure.

The conventional SAO scheme often determines the category for the pixels on a picture by picture or slice by slice basis. However, picture contents often are dynamic and the characteristic may vary from region to region within a frame. Therefore, it is desirable to develop a sample adaptive offset scheme that can take into consideration of the dynamic characteristics within a picture using a region partition scheme to adaptively partition the processed video data into regions having different sizes. Furthermore, the conventional SAO scheme always uses a fixed context to determine a category for the pixel of processed video data. For example, the SAO may only use a fixed 16-band band offset (BO) for sample adaptive offset. In another example, the SAO may only use pixels within a 3×3 window as the context to determine the category for the pixel of processed video data. It is desirable that the sample adaptive offset scheme can adaptively select a SAO type from a group of SAO types to tailor the SAO process to the characteristics of processed video data and to achieve better quality. Accordingly, a sample adaptive offset scheme is disclosed herein that can exploit the dynamic characteristics of processed video data.

The exemplary encoder shown in FIG. 1 represents a system using intra/inter-prediction. Intra-prediction 110 is responsible to provide prediction data based on video data in the same picture. For inter-prediction, motion estimation (ME) and motion compensation (MC) 112 is used to provide prediction data based on video data from other picture or pictures. Switch 114 selects intra-prediction or inter-prediction data and the selected prediction data are supplied to adder 116 to form prediction errors, also called residues. The prediction error is then processed by transformation (T) 118 followed by quantization (Q) 120. The transformed and quantized residues are then coded by entropy coding 122 to form a bitstream corresponding to the compressed video data. The bitstream associated with the transform coefficients is then packed with side information such as motion, mode, and other information associated with the image area. The side information may also be subject to entropy coding to reduce required bandwidth. Accordingly the data associated with the side information are provided to entropy coding 122 as shown in FIG. 1. When an inter-prediction mode is used, a reference picture or reference pictures have to be reconstructed at the encoder end. Consequently, the transformed and quantized residues are processed by inverse quantization (IQ) 124 and inverse transformation (IT) 126 to recover the residues. The residues are then added back to prediction data 136 at reconstruction (REC) 128 to reconstruct video data. The reconstructed video data may be stored in reference picture buffer 134 and used for prediction of other pictures. Before the reconstructed video data are stored in the reference picture buffer, deblocking filter 130 and adaptive loop filter 132 are applied to the reconstructed video data in order to improve video quality. The adaptive loop filter information may have to be transmitted in the bitstream so that a decoder can properly recover the required information in order to apply the adaptive loop filter. Therefore, adaptive loop filter information from ALF 132 is provided to entropy coding 122 for incorporation into the bitstream. As it is shown in FIG. 1, incoming video data undergo a series of processing in the encoding system. The reconstructed video data from REC 128 may be subject to intensity shift due to the series of processing. The reconstructed video data are further processed by deblocking 130 and adaptive loop filter 132, which may cause further intensity shift. Accordingly, it is desired to incorporate sample adaptive offset to restore or compensate the intensity shift.

Figure 2:
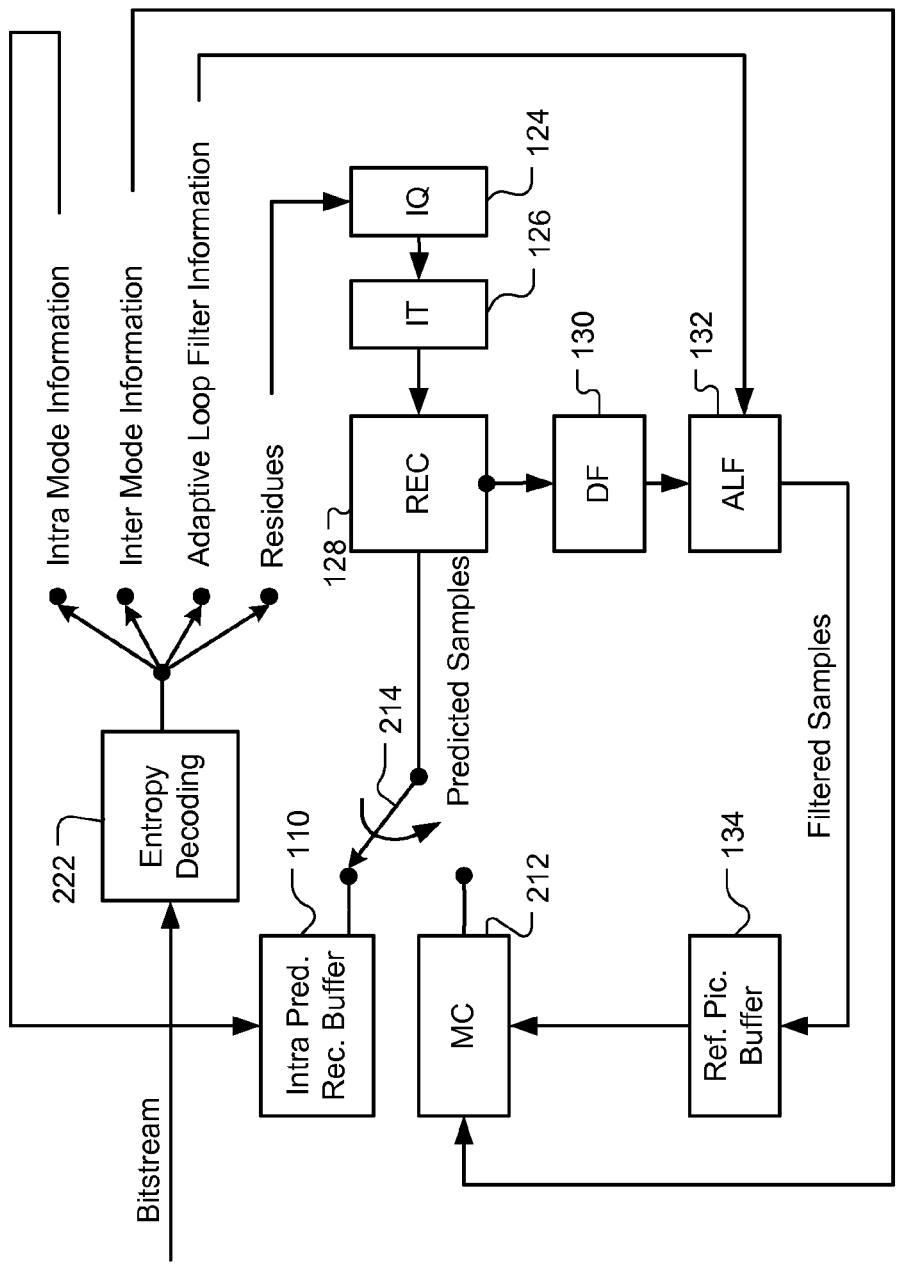
FIG. 2 illustrates a system block diagram of an exemplary video decoder including deblocking filter and adaptive loop filter.

FIG. 2 illustrates a system block diagram of an exemplary video decoder including deblocking filter and adaptive loop filter. Since the encoder also contains a local decoder for reconstructing the video data, some decoder components are already used in the encoder except for the entropy decoder 222. Furthermore, only motion compensation 212 is required for the decoder side. The switch 214 selects intra-prediction or inter-prediction and the selected prediction data are supplied to reconstruction (REC) 128 to be combined with recovered residues. Besides performing entropy decoding on compressed video data, entropy decoding 222 is also responsible for entropy decoding of side information and provides the side information to respective blocks. For example, intra mode information is provided to intra-prediction 110, inter mode information is provided to motion compensation 212, adaptive loop filter information is provided to ALF 132 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to intensity shift. The reconstructed video data are further processed by deblocking filter 130 and adaptive loop filter 132, which may cause further intensity shift. Accordingly, it is desired to incorporate sample adaptive offset to compensate the intensity shift.

Figure 3:
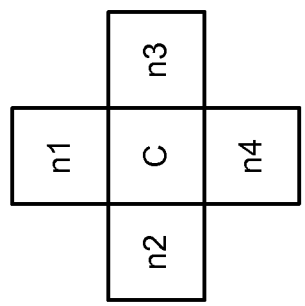
FIG. 3 illustrates an example of adaptive offset based on pixel category, where the category is determined according to pixel C and its neighboring pixels n1-n4.

In order to overcome the offset problems, McCann et al. disclosed a content adaptive extreme correction and band correction in "Samsung's Response to the Call for Proposals on Video Compression Technology", Document: JCTVC-A124, Joint Collaborative Team on Video Coding (JCT-VC) of ITU-T SG16 WP3 and ISO/IEC JTC1/SC29/WG11, 1st Meeting: Dresden, Del., 15-23 Apr. 2010. The use of content information based on neighboring pixels can explore local edge characteristics and may result in improved performance in terms of better visual quality or bit rate reduction. McCann et al. disclosed a neighboring pixel configuration as shown in FIG. 3, where C is the current pixel value and n1 through n4 are four neighboring pixels on the top, left, right and bottom sides of the current pixel respectively. The method to classify pixels into seven categories according to McCann et al. is shown in Table 1:

TABLE 1

| Category | Condition | Note |
|---|---|---|
| 0 | C < 4 neighbors | Local min |
| 1 | C < 3 neighbors && C = $4^{th}$ neighbor | Object edge |
| 2 | C < 3 neighbors && C > $4^{th}$ neighbor | Object edge |
| 3 | C > 3 neighbors && C < $4^{th}$ neighbor | Object edge |
| 4 | C > 3 neighbors && C = $4^{th}$ neighbor | Object edge |
| 5 | C > 4 neighbors | Local max |
| 6 | None of the above | Other |

For category 0, the pixel C is a local minimum, also called a valley. For category 5, the pixel C is a local maximum, also called a peak. For categories 1, 2, 3 and 4, the pixel C is at an object edge. For pixels in each category, the difference between the mean of processed video data and the mean of original video data is computed and transmitted to the decoder. The processed video data can be the reconstructed video data from REC 128, the deblocked data from DF 130 or the adaptive loop filtered data from ALF 132. McCann et al. classify the edge characteristics into "categories", which are also termed as "classes". While FIG. 1 and FIG. 2 illustrate exemplary systems that sample adaptive offset for video coding can be applied, other systems may also embody the present invention to overcome the intensity shift issue. For example, in the camera image processing system, video data processed by demosaicing, white balancing, and/or edge enhancement may also be subject to intensity shift. As disclosed above, McCann et al. apply a first intensity offset to restore processed data between DF 130 and ALF 132 according to edge characteristic of underlying pixel. The adaptive offset based on the edge characteristic of underlying pixel is termed as Extreme Correction (EXC) by McCann et al.

According to McCann et al., the above extreme correction is applied to reconstructed video data. The reconstructed mean intensity value Vr(c) corresponding to class c and the original mean intensity value Vo(c) corresponding to class c are determined for a video picture. The offset Vd(c) corresponding to class c can be determined according to:

$$Vd(c)=Vo(c)-Vr(c).$$

The offset Vd(c) as computed above is added to the reconstructed video data belonging to class c, i.e., Vr'(c)=Vr(c)+Vd(c), where Vr'(c) is the offset corrected video data. In order for a decoder to apply the proper offset for respective classes, the offset Vd(c) values for all classes have to be transmitted to the decoder. Proper bitstream syntax will be needed to incorporate the offset Vd(c) values.

Figure 4:
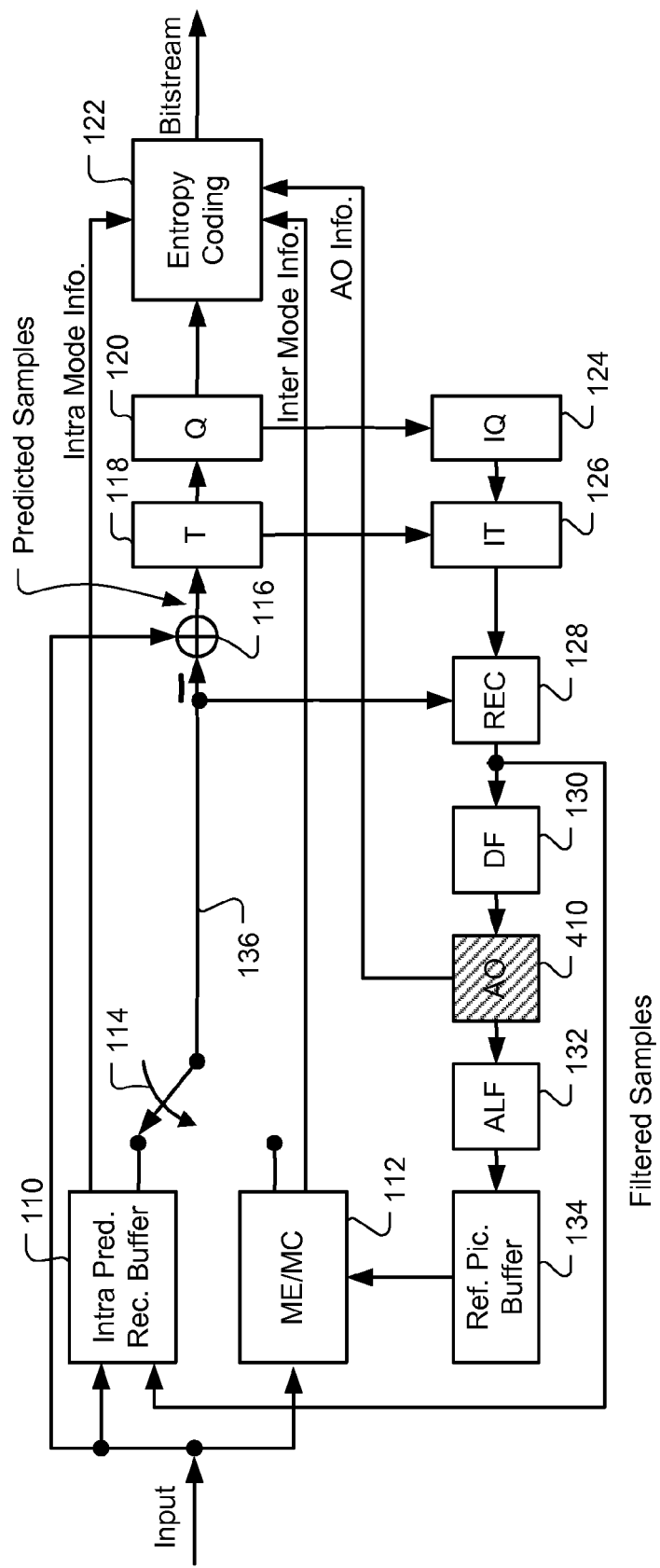
FIG. 4 illustrates an exemplary system block diagram of a video encoder where sample adaptive offset is applied to video data after deblocking filter.
Figure 5:
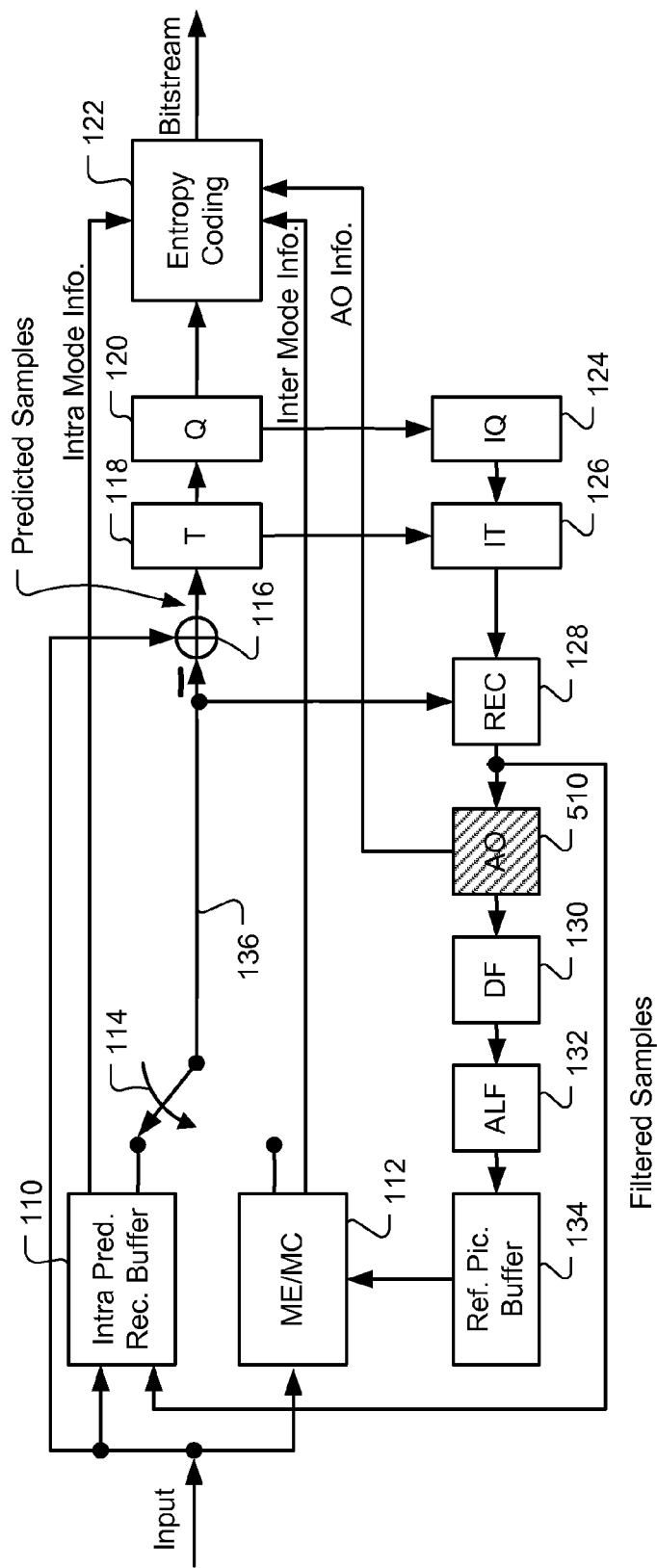
FIG. 5 illustrates an exemplary system block diagram of a video encoder where sample adaptive offset is applied to video data after reconstruction.
Figure 7D:
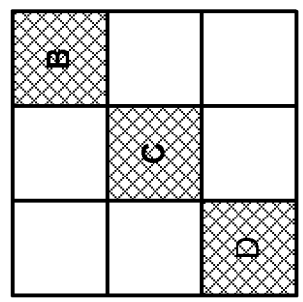
FIGS. 7A-D illustrate four linear configurations of a current pixel and its neighboring pixels for pixel category determination.
Figure 7C:
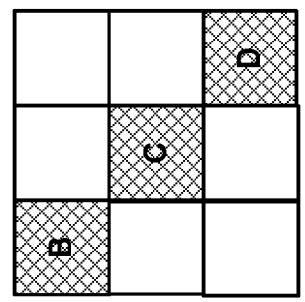
Figure 7B:
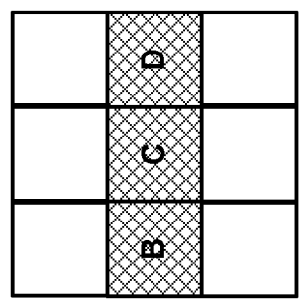
Figure 7A:
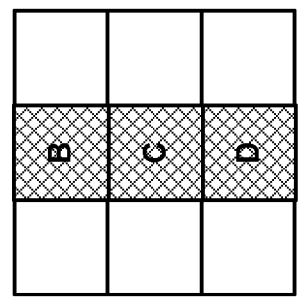

The Adaptive Offset 410 based on EXC according to McCaan et al., is applied to video data between DF 130 and ALF 132, as shown in FIG. 4. McCann et al. disclosed another adaptive offset correction according to the band that an underlying pixel belongs to. This method is also termed as band correction (BDC). According to McCann et al., the main motivation of band-based classification is to equalize two different Probability Density Functions (PDFs) of underlying data corresponding to the reconstructed video data and the original video data. McCann et al. disclosed a band-based classification by using the p most significant bits of the pixels, which is equivalent to dividing the intensity into $2^p$ classes having uniform intervals. In one implementation, McCann et al. selected p=4 to divide the intensity into 16 equally spaced bands, also termed as classes. For each band or class, the mean difference is computed and transmitted to the decoder and the offset can be corrected individually for each band. The reconstructed mean intensity value Vr(c) corresponding to band c or class c and the original mean intensity value Vo(c) corresponding to band c or class c are determined for a video picture. The same mathematical symbols Vr(c) and Vo(c) for EXC have been used for convenience. As in the adaptive offset correction based on edge characteristics, the offset Vd(c) associated corresponding to class c can be determined according to Vd(c)=Vo(c)−Vr(c). The offset Vd(c) as computed above is then added to the reconstructed video data belonging to class c, i.e., Vr'(c)=Vr(c)+Vd(c), where Vr'(c) is the offset corrected video data. McCann et al. apply band correction to processed video data between ALF 132 and reference picture buffer 134 (not shown). While McCann et al. apply AO either between DF 130 and ALF 132, or between ALF 132 and Reference Picture Buffer 134, AO 510 may also be applied between REC 128 and DF 130 as shown in FIG. 5.

In additional to 16 uniform bands for band classification, 32 uniform bands for band classification to increase the possibility of nonzero are described in "CE8 Subset3: Picture Quadtree Adaptive Offset", Document: JCTVC-D122, Joint Collaborative Team on Video Coding (JCT-VC) of ITU-T SG16 WP3 and ISO/IEC JTC1/SC29/WG11, 4th Meeting: Daegu, KR, 20-28 Jan. 2011, and in "CE13: Sample Adaptive Offset with LCU-Independent Decoding", Document: JCTVC-E049, Joint Collaborative Team on Video Coding (JCT-VC) of ITU-T SG16 WP3 and ISO/IEC JTC1/SC29/WG11, 5th Meeting: Geneva, C H, 16-23 Mar. 2011, and in U.S. Non-Provisional Patent Application, Ser. No. 12/987,151, entitled "Apparatus and Method of Adaptive Offset for Video Coding", filed on Jan. 9, 2011. In order to reduce side information (from 32 offsets to 16), the 32 uniform bands are divided into two groups as shown in FIG. 6. The 16 bands in the center are assigned to group 1 and the 16 bands on both sides are assigned to group 2. Accordingly, one set of offsets is sent for the center 16 bands (group 1), and one set of offsets is sent for the outer 16 bands (group 2).

While McCann et al. disclosed adaptive processing related to edge characteristics of an underlying pixel and the pixel classification is based on a whole picture, an alternative edge based adaptive offset is disclosed in the co-pending U.S. patent application, Ser. No. 12/987,151, entitled "Apparatus and Method of Adaptive Offset for Video Coding", filed Jan. 9, 2011, where simplified linear pixel configurations using two neighboring pixels are used. The use of simplified pixel configuration will reduce the required computation. Accordingly, four simplified pixel configurations, also called pixel patterns, are disclosed as shown in FIGS. 7A-7D corresponding to vertical line (90-degree), horizontal line (0-degree), 135-degree line and 45-degree line respectively. Each pixel configuration arranged as a short line is responsive to intensity transition along the line. For example, a horizontal edge will cause a more noticeable intensity transition in the vertical line than lines having other orientations. Similarly, a vertical edge will cause more noticeable intensity transition in the horizontal line than lines having other orientation. The selection of pixel configuration can be determined on a region by region basis and a flag is required for each region. Based on the pixel configuration, an underlying pixel is classified into 6 classes corresponding to edges, peak, valley and none of the above as shown in Table 2:

TABLE 2

| Category | Condition | Note |
|---|---|---|
| 0 | C < 2 neighbors | Local min |
| 1 | C < 1 neighbor && C = 1 neighbor | Edge |
| 2 | C > 1 neighbor && C < 1 neighbor | Edge |
| 3 | C > 1 neighbor && C = 1 neighbor | Edge |
| 4 | C > 2 neighbors | Local max |
| 5 | None of the above | Other |

While the SAO schemes mentioned above utilize either the band offset (BO) context or the edge offset (EO) context to classify pixels into categories, an embodiment according to the present invention utilizes multiple SAO types. For example, the multiple SAO types may include both the BO context and EO context. Each SAO type has an associated number of categories. For example, 16 categories (i.e., 16 bands) are associated with group 1 BO and group 2 BO in the above example. 6 categories are associated with each of the four EO configurations or contexts. The number of categories mentioned in the above example is intended for illustration purpose and shall not be construed as limitation to the present invention. The total number of SAO types according to the present invention can be pre-defined or user defined. Furthermore, the number of categories for each SAO type can be pre-defined, user defined, or image size dependent. When multiple SAO types are used, a syntax element sao_type_idx may be used to identify the SAO type selected. Table 3 illustrates an example of multiple SAO types including both the BO context and the EO context.

TABLE 3

| sao_type_idx | sample adaptive offset type to be used | Number of categories, nSaoLength [sao_type_idx] |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | central bands band offset | 16 |
| 6 | side bands band offset | 16 |

Figure 8:
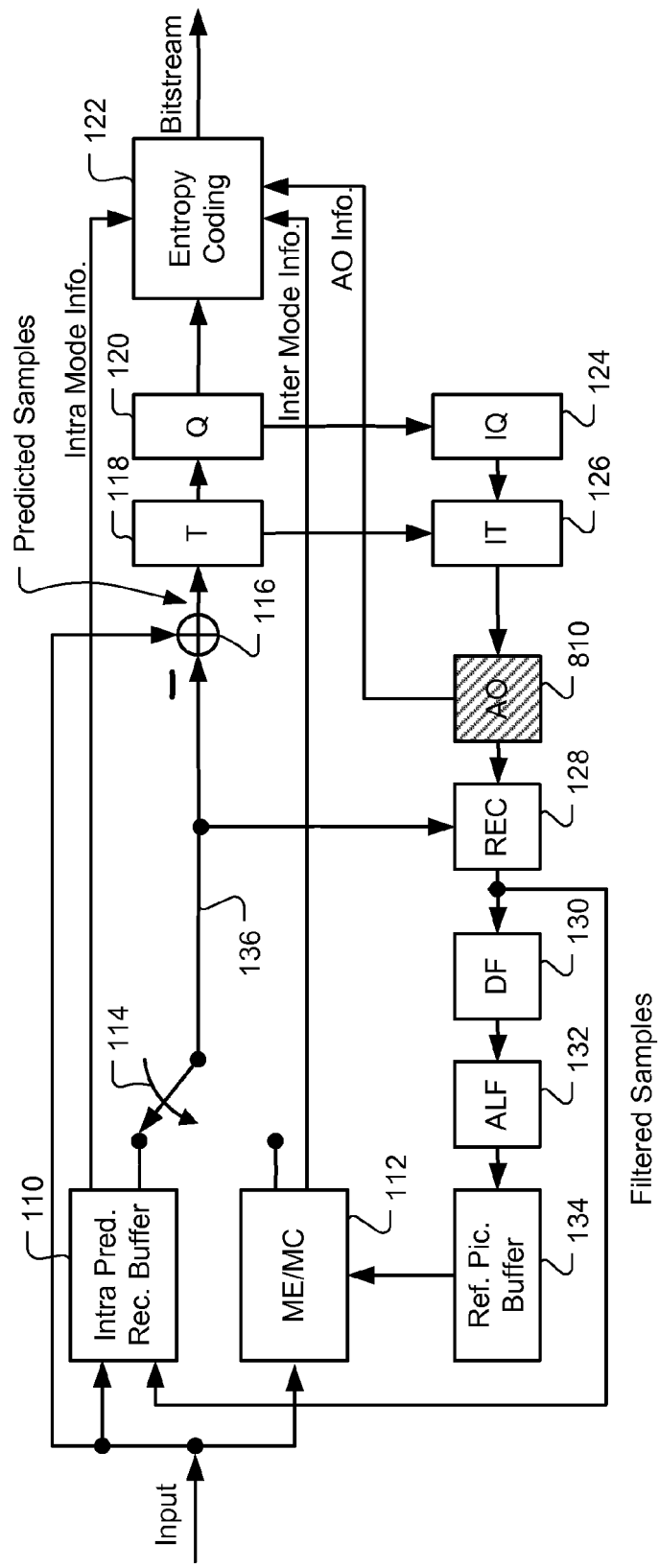
FIG. 8 illustrates a system block diagram of a video encoder wherein sample adaptive offset is applied to video data after inverse transform.
Figure 9:
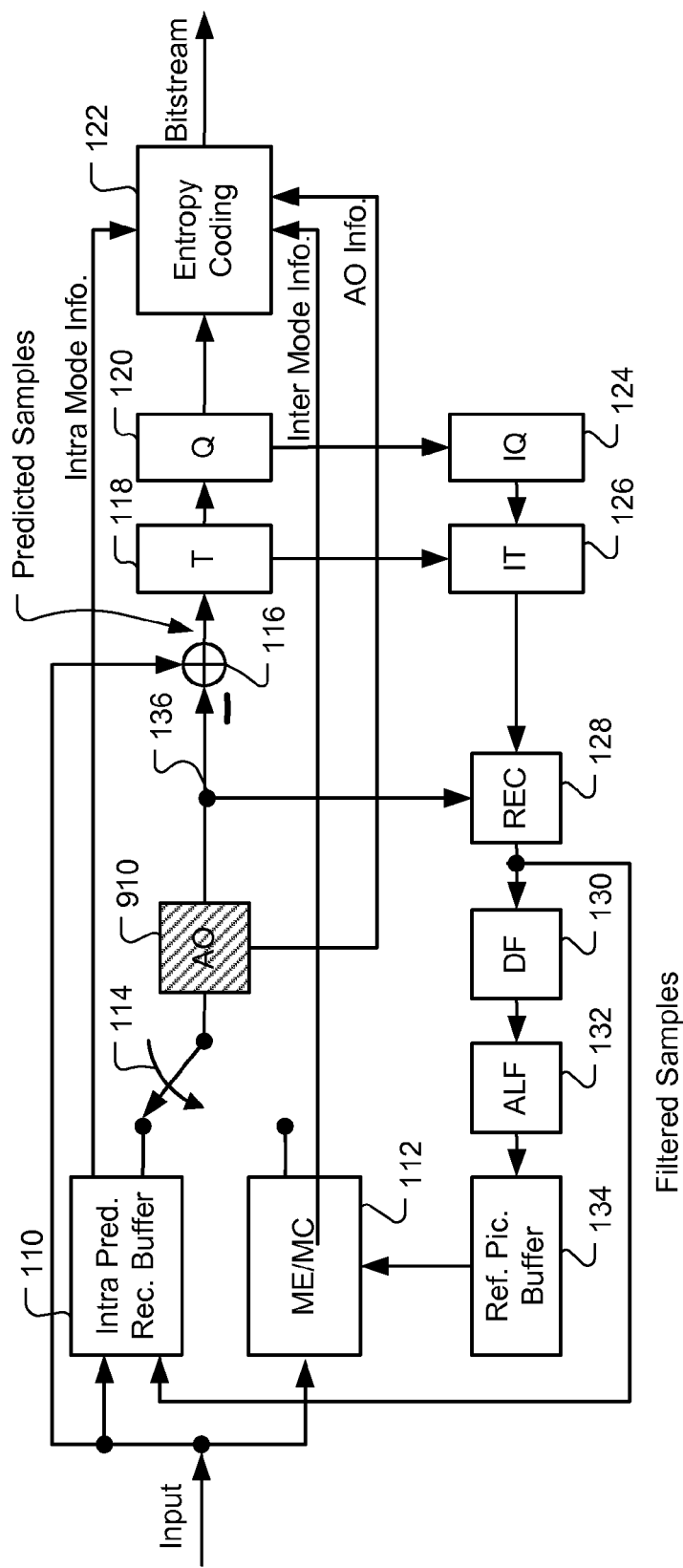
FIG. 9 illustrates an exemplary system block diagram of a video encoder where sample adaptive offset is applied to the prediction signal.
Figure 10:
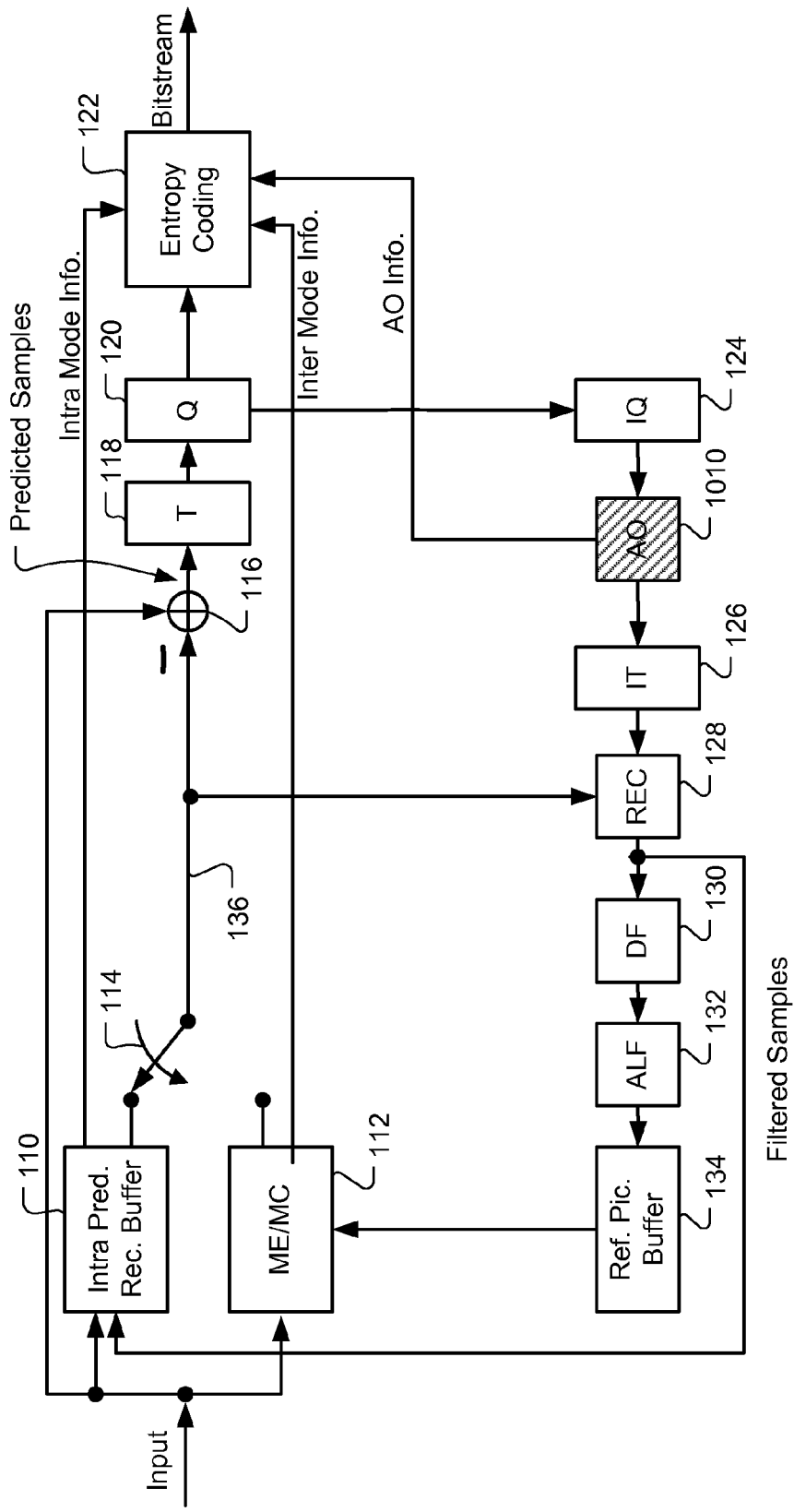
FIG. 10 illustrates an exemplary system block diagram of a video encoder where sample adaptive offset is applied to the de-quantized signal.

While sample adaptive offset has been always applied to the video signal after reconstruction to restore the video signal, sample adaptive offset may also be applied to the video signal before reconstruction. For example, sample adaptive offset 810 may be applied to inverse transformed residual signal before reconstruction (REC) 128 as shown in FIG. 8. The recovered residual signal at the output of inverse transform (IT) 126 has been processed by transform 118, quantization 120, de-quantization 124 and inverse transform 126. Therefore, the residual signal may be subject to intensity shift and adaptive offset will be useful to restore the intensity shift. Side information associated with adaptive offset may be entropy coded and incorporated into the bitstream. In another example, sample adaptive offset is applied to the intra/inter predictor before the predictor is subtracted from the original video signal as shown in FIG. 9. The predictor derived according to either Intra or Inter prediction is subject to various operations which may cause intensity shift. Therefore, sample adaptive offset will be useful to restore the intensity shift. In yet another example, sample adaptive offset 1010 may be applied to video signal between de-quantization 124 and inverse transformation 126 as shown in FIG. 10.

Figure 11:
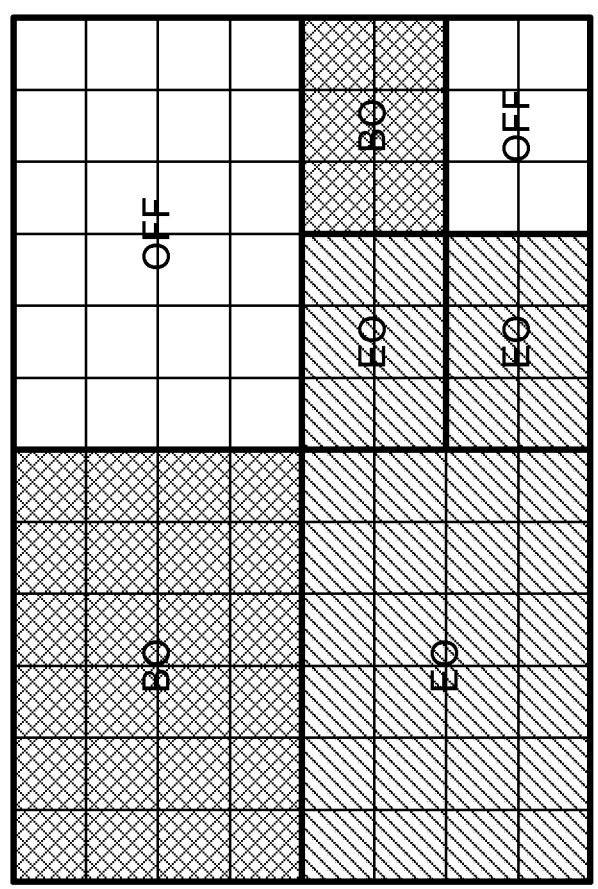
FIG. 11 illustrates an example of recursive region partition, wherein a SAO type is selected for each region.

In the method by McCann et al., the AO is always based on a whole picture or a group of pictures. For some video data, a region corresponding to a smaller picture area may be more advantageous for adaptive processing because the category associated with a smaller picture area may closely characterize the underlying video data in the region. Accordingly, a multi-level region partition is used in the present invention. Each region can be recursively divided into four sub-regions using a quadtree. Information related to the region partition can be conveyed using syntax. The region boundaries can be aligned with the coding unit (CU) or with the largest coding unit (LCU). Each region can select one of the sample adaptive offset (SAO) types such as 2 types of band offset (BO), 4 types of edge offset (EO) and no processing (OFF) as shown in the above table. FIG. 11 illustrates an example of picture partitioned into regions and each region is processed by SAO using BO, EO or OFF type. Each small block in FIG. 11 represents a LCU.

Figure 12:
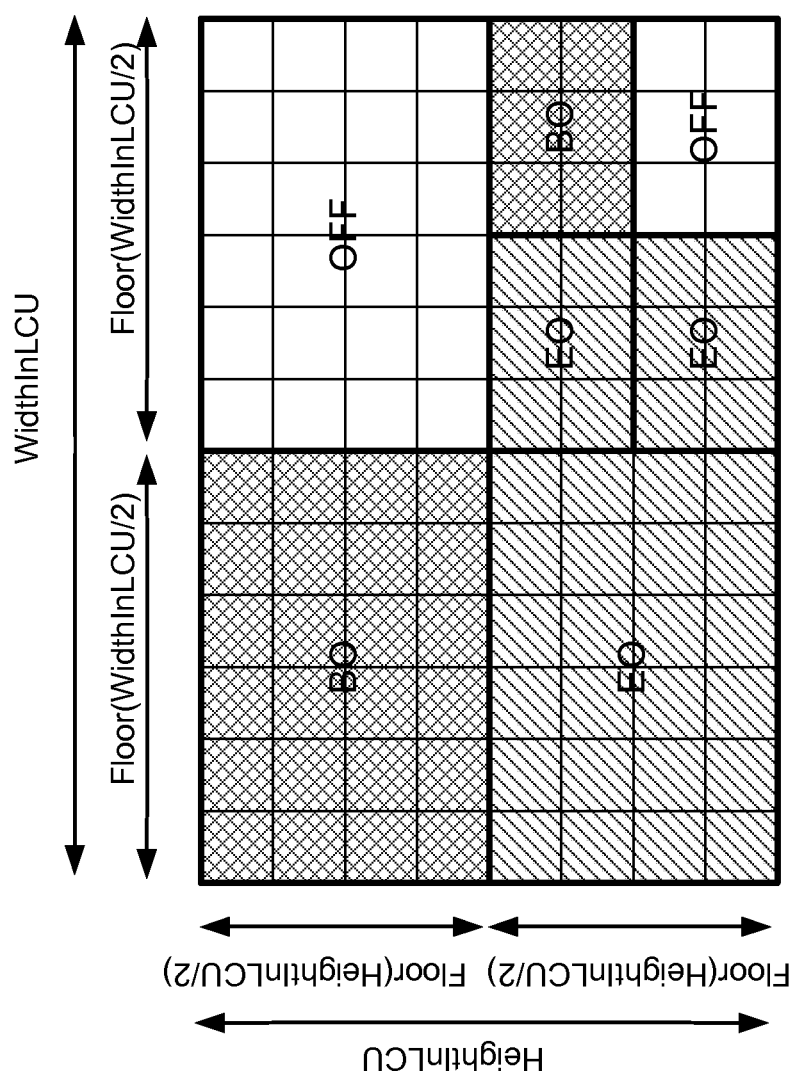
FIG. 12 illustrates an example of recursive region partition by dividing a region into four sub-regions having roughly the same number of LCUs horizontally and vertically.

Region partition for SAO can be block based. The number of depths in quadtree partition is depending on the block size. If either the region width or region height is smaller than the block size, the splitting process for the current region will be terminated. The maximum quadtree depth can be user-defined depth, pre-defined depth, or image size. The block size can be smaller than, equal to, or larger than the LCU size. An example of LCU aligned region partitioning is shown in FIG. 12. The region is measured by LCU size. WidthInLCU is the number of LCUs for the width of the current region and HeightInLCU is the number of LCUs for the height of the current region. The partition in the horizontal direction divides WidthInLCU into two sub-regions having widths Floor(WidthInLCU/2) and WidthInLCU−Floor(WidthInLCU/2), where Floor(x) is the floor function. Similarly, the partition in the vertical direction divides HeightInLCU into two sub-regions having widths Floor(HeightInLCU/2) and HeightInLCU−Floor(HeightInLCU/2).

The 1-D edge offset (EO) classification is more computational efficient than the 2-D EO classification. Nevertheless, the 1-D EO classification algorithm as described in Table 2 still requires quite some operations. It is desirable to further improve the computational efficiency. Accordingly, one aspect of the present invention discloses a fast algorithm for EO based classification. The fast algorithm compares the current pixel with two neighboring pixels. The results of comparison are provided to a look-up table to determine the category. The comparison can be implemented as a sign( ) function. For example, the current pixel C and two neighboring pixels B and D for a 0-degree EO 1310 is shown in FIG. 13. The sign operation is performed for (C−B) and (C−D), i.e., sign(C−B) and sign (C−D) are performed, where $$\text{sign}(x) = \begin{cases} +1 & \text{if } x > th, \\ -1 & \text{elseif } x < th, \\ 0 & \text{else.} \end{cases}$$

A look-up table, i.e., edge_table, can be used to convert the comparison results into a category index, where edge_table[x]={1, 2, 0, 3, 4}. Accordingly, the Category for the 1-D EO classification can be derived as:

Category=edge_table[2+sign(C−B)+sign(C−D)].

When the th value is zero, the pixel classification is exactly the same as Table 2. The comparison of C and D is computed for pixel C. The comparison of D and C will be computed for pixel D for the 1-D EO 1320 as shown in FIG. 13. The comparison of C and D may be re-used for comparison of D and C, i.e., sign(D−C)=−sign(C−D), which can save some operations. While the sign( ) function is used as a means for determining the relation between a current pixel and its neighboring pixels, other measurement may be used as well. While the 0-degree 1-D EO is shown as an example, the same fast algorithm can be applied to 45-degree, 90-degree, and 135-degree EO.

Figure 14:
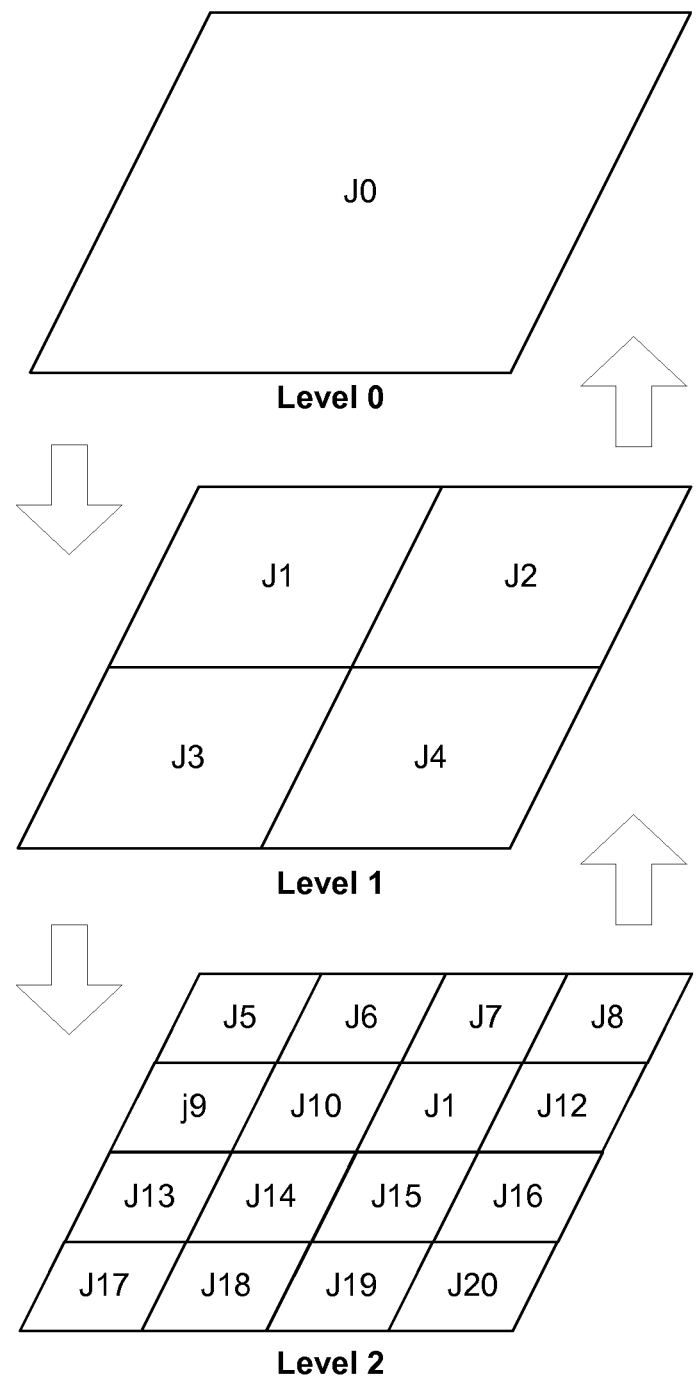
FIG. 14 illustrates an example of region splitting and region merging for sample adaptive offset.

Another aspect of the present invention is related to simplified rate-distortion optimization (RDO) for SAO decision. Rate-distortion optimization (RDO) is a widely known technique used in video encoding to obtain good coding efficiency. RDO can be applied to SAO decision such as region splitting and region merging. For example, FIG. 14 illustrates an example of region splitting and region merging for SAO. To achieve the best RD performance among various region partition, a picture or a picture area, such as a region, may be successfully split from a largest picture area (top-down splitting) or small picture regions may be successfully merged into larger regions using the RDO technique (bottom-up merging). FIG. 14 illustrates a three-level picture structure, where J0 through J20 are the R-D costs associated with respective regions. For the top-down splitting method, the cost associated each region is compared with the costs of corresponding split regions. For example, cost J3 is compared with cost (J13+J14+J17+J18). The region associated with J3 is split if J3>(J13+J14+J17+J18); otherwise the region is not split. Similarly, the region associated with J0 is split if J0>(J1+J2+J3+J3); otherwise the region is not split. The process for region merging can be done similarly by comparing the costs associated with individual regions and a merged region.

The RDO process is quite computational intensive. It is desirable to develop a means for speeding up RDO process. For example, in region splitting and region merging, the statistics (i.e., rate and/or distortion) associated with a larger region can be derived from the corresponding smaller regions. Furthermore, in SAO, there are multiple regions in one picture, and there are multiple SAO types to be tested for each region. Given one region with one SAO type, an encoder usually has to derive the offsets, add the offsets to pixels, and then compute distortion. Therefore, the mode decision process of SAO needs to access the picture buffer many times. This multi-pass encoding algorithm may require a lot of external memory access leading to high power consumption and long latency. It is also desirable to perform the mode decision for SAO without any additional picture buffer access. After all SAO parameters are derived, only one additional pass is required to perform offset compensation accordingly. Therefore, instead of computing actual rate and/or distortion values, these values can be estimated. For example, the distortion for SAO can be estimated as follows:

s(k) is the original signal, x(k) is the reconstructed signal, which can be deblocked signal, $\epsilon_{rec}(k)$ is the estimated distortion of the reconstructed signal, and $\epsilon_{AO}(k)$ is the estimated distortion of the SAO signal.

K is a set of pixels to be processed by filter,

C is a set of pixels belonged to one type of AO category,

P is a set of SAO category, and P is a collection of all SAO categories, and $\alpha_c$ is the offset value to be added.

The distortion reduction of the SAO signal is $\epsilon_{SAO}(k)-\epsilon_{rec}(k)$, which represents the difference in mean square errors corresponding to the signal processed by SAO and the reconstructed signal respectively.

$\varepsilon_{rec}$ = mean square error between reconstructed signal and original signal $$= \sum_{x \in K} (x(k) - s(k))^2$$

$$= \sum_{x \in K} (x(k)^2 - 2 \cdot x(k) \cdot s(k) + s(k)^2)$$

$$= \sum_{x \in K} (r_{xx}(0) - 2 \cdot r_{xs}(0) + r_{ss}(0))$$

$$= \sum_{x \in K} (r_{x'x'}(0) - 2 \cdot r_{x's}(0) + r_{ss}(0))$$

$\varepsilon_{SAO}$ = mean square error between offset signal and original signal $$= \sum_{c \in P} \sum_{x \in C} ((x(k) + a_c) - s(k))^2$$

$$= \sum_{c \in P} \sum_{x \in C} (x(k)^2 - 2 \cdot x(k) \cdot s(k) + s(k)^2 + 2 \cdot a_c \cdot x(k) + a_c^2 - 2 \cdot a_c \cdot s(k))$$

$$= \sum_{c \in P} \sum_{x \in C} (r_{xx}(0) - 2 \cdot r_{xs}(0) + r_{ss}(0)) + 2 \cdot a_c \cdot x(k) + a_c^2 - 2 \cdot a_c \cdot s(k))$$

$d\varepsilon_{SAO} = \varepsilon_{SAO} - \varepsilon_{rec}$

= distortion reduction of offset signal after the SAO is applied $$= \sum_{c \in P} \sum_{x \in C} (r_{xx}(0) - 2 \cdot r_{xs}(0) + r_{ss}(0)) + 2 \cdot a_c \cdot x(k) + a_c^2 - 2 \cdot a_c \cdot s(k)) - \sum_{k \in K} (r_{xx}(0) - 2 \cdot r_{xs}(0) + r_{ss}(0))$$

$$= \sum_{c \in P} \sum_{k \in C} (2 \cdot a_c \cdot x(k) + a_c^2 - 2 \cdot a_c \cdot s(k))$$

$$= \sum_{c \in P} \sum_{k \in C} (2 \cdot a_c \cdot (s(k) - a_{c,s}) + a_c^2 - 2 \cdot a_c \cdot s(k))$$

$$= \sum_{c \in P} \sum_{k \in C} (a_c^2 - 2 \cdot a_c \cdot a_{c,s})$$

$$= \sum_{c \in P} (N_c a_c^2 - 2 \cdot N_c \cdot a_c \cdot a_{c,s})$$

where $N_c$ is the number of pixel of current category,
$\alpha_{c,s}$ is the offset value to be added on the pixels belonging to category k, and
$\alpha_c$ is the sum of the offset value between original signal and reconstructed signal.

According to the above derivation, the distortion reduction $d\varepsilon_{AO}$ offset signal after the SAO is applied can be estimated from:

$$d\varepsilon_{SAO} = \sum_{c \in P} (N_c a_c^2 - 2 \cdot N_c \cdot a_c \cdot a_{cs}). \quad (1)$$

According to equation (1), the distortion reduction $d\varepsilon_{SAO}$ of offset signal after the SAO is applied can be estimated based on the number of pixel of current category, the offset value to be added on the pixels belonging to category k, and the sum of the offset value between original signal and reconstructed signal. The distortion used in the cost function of RDO process is derived between the SAO processed signal and the original signal. Various SAO modes are evaluated for the RDO to select a best mode, where the SAO process is applied to the same reconstructed signal. Therefore, the distortion reduction $d\varepsilon_{SAO}$ can be used to replace the mean square error $\varepsilon_{SAO}$ between offset signal and original signal. As shown in equation (1), the computation of distortion reduction $d\varepsilon_{SAO}$ can be estimated using the fast algorithm. On the other hand, derivation based on the original distortion reduction or the original distortion between offset signal and original signal will involve computations of autocorrelation of original signal, autocorrelation of the reconstructed signal, and cross-correlation between the original signal and the reconstructed signal. Consequently, the estimated distortion reduction can greatly reduce the required computation and picture buffer access. An embodiment according to the present invention computes the estimated distortion reduction for each mode and uses the estimated distortion reduction to evaluate the RDO cost function. The mode can be the region associated with region splitting/region merging to be optimized. According to the RDO cost function associated with the mode candidates, a best mode is selected.

An example of estimated distortion calculation for fast rate-distortion optimization (RDO) for SAO design is shown as follows.
1. The following statistic information is collected for each SAO mode.
   iCount: the number of pixel of current category.
   iOffset: the offset value to compensate of current category.
   iOffsetOrg: sum of differences between original signal and reconstructed signal.
2. The fast distortion estimation ($\hat{D}$) of SAO is calculated according to:

$$\hat{D} = (iCount*iOffset*iOffset) - (iOffsetOrg*iOffset*2). \quad (2)$$

The fast distortion estimation ($\hat{D}$) of SAO calculated according to eqn. (2) can be used in the RDO to replace the regular distortion measurement. As shown in eqn. (2), the fast distortion estimation can be efficiently calculated for each iOffset. After the number of pixel of the current category (iCount) is counted, the first part of the fast distortion estimation ($\hat{D}$) requires two multiplications, i.e., iCount*iOffset*iOffset for each iOffsetOrg. The calculation of iOffsetOrg only requires the addition operation (i.e., no multiplication). The second part of the fast distortion estimation ($\hat{D}$) requires no more than two multiplications (i.e., iOffsetOrg*iOffset*2) for each iOffsetOrg. On the other hand, a conventional distortion measure often involves calculation of sum or mean of squared errors (e.g., $\varepsilon_{SAO}$ and $\varepsilon_{rec}$ as mentioned before), which would require at least one multiplication for each pixel. Accordingly, the fast distortion estimation ($\hat{D}$) according to eqn. (2) is much more efficient than the convention distortion computation.

Embodiment of sample adaptive offset compensation according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of mode decision for sample adaptive offset (SAO) compensation of processed video data using fast rate-distortion optimization (RDO), the method comprising:
   receiving reconstructed pixels of the processed video;
   receiving original pixels of original video;
   identifying SAO modes;
   determining distortion reduction associated with said each of the SAO modes based on a difference of first mean squared error between SAO compensated pixels and original pixels of the original video, and second mean squared error between the reconstructed pixels and the original pixels, wherein said determining the distortion reduction is calculated based on the difference between the first mean squared error and the second mean squared error without computing a squared reconstructed pixel term or a squared original pixel term;
   determining rate-distortion (RD) cost for said each of the SAO modes, wherein the rate-distortion (RD) cost is computed based on the distortion reduction associated with said each of the SAO modes;
   selecting a best SAO mode among the SAO modes, wherein the best mode has a smallest RD cost; and
   applying SAO to the reconstructed pixels according to the best mode selected.

2. The method of claim 1, wherein the distortion reduction is calculated according to (iCount*iOffset*iOffset)−(iOffsetOrg*iOffset*2) for said each of the SAO modes, wherein iCount corresponds to a number of pixels for said each of the SAO modes, iOffset corresponds to the offset value for said each of the SAO modes, and iOffsetOrg corresponds to a sum of third differences between the original pixels and the reconstructed pixels.

3. The method of claim 1, wherein the distortion reduction for a small regions is re-used for calculating the distortion reduction for a respective large region when the modes are associated with region splitting or region merging.

4. An apparatus of mode decision for sample adaptive offset (SAO) compensation of processed video data using fast rate-distortion optimization (RDO), the apparatus comprising one or more electronic circuits configured to:
   receive reconstructed pixels of the processed video;
   receive original pixels of original video;
   identify SAO modes;
   determine distortion reduction associated with said each of the SAO modes based on a difference of first mean squared error between SAO compensated pixels and original pixels of the original video, and second mean squared error between the reconstructed pixels and the original pixels, wherein the distortion reduction is calculated based on the difference between the first mean squared error and the second mean squared error without computing a squared reconstructed pixel term or a squared original pixel term;
   determine rate-distortion (RD) cost for said each of the SAO modes, wherein the rate-distortion (RD) cost is computed based on the distortion reduction associated with said each of the SAO modes;
   select a best SAO mode among the SAO modes, wherein the best mode has a smallest RD cost; and
   apply SAO to the reconstructed pixels according to the best mode selected.

5. The apparatus of claim 4, wherein the distortion reduction is calculated according to (iCount*iOffset*iOffset)−(iOffsetOrg*iOffset*2) for said each of the SAO modes, wherein iCount corresponds to a number of pixels for said each of the SAO modes, iOffset corresponds to the offset value for said each of the SAO modes, and iOffsetOrg corresponds to a sum of third differences between the original pixels and the reconstructed pixels.

6. The apparatus of claim 4, wherein the distortion reduction for a small regions is re-used for calculating the distortion reduction for a respective large region when the modes are associated with region splitting or region merging.

* * * * *